Patented Oct. 9, 1951

2,570,900

UNITED STATES PATENT OFFICE 2,570,900

INHERENTLY PROCESSABLE INTERPOLYMERS OF VINYL CHLORIDE, VINYL AROMATIC ESTER, AND HIGHER ALKYL ACRYLATE

Robert J. Wolf, Cleveland, Ohio, assignor to The B. F. Goodrich Company, New York, N. Y., a corporation of New York No Drawing. Application October 15, 1949, Serial No. 121,632

6 Claims. (Cl. 260—80.5)

The present invention relates to thermoplastic interpolymers obtained by the polymerization of monomeric mixtures containing at least three monomeric components, each in particular proportions, one of which is vinyl chloride, another of which is a vinyl ester of an aromatic monocarboxylic acid, such as vinyl benzoate, and another of which is a higher alkyl acrylate, such as an octyl acrylate, which interpolymers possess various new and unique properties, especially in regard to their inherent ease of processing combined with excellent physical properties and heat and light stability, and their ability to retain their useful properties over a wide temperature range; and it pertains particularly to three-component interpolymers or tripolymers of these three types of monomers which are so inherently processable as to be easily made into excellent films, sheets, rods, tubes and plates without the extraneous addition of plasticizers.

Vinyl resins such as polyvinyl chloride and copolymers of vinyl chloride with various other monomeric materials such as vinylidene chloride, vinyl acetate, methyl acrylate and diethyl fumarate are well known to the art and are widely used in numerous familiar applications. In using such resins it is the practice to first mix the thermoplastic resin, which itself is relatively hard and horny at normal temperatures and is generally incapable of being easily subjected to processing operations such as milling, calendering, and extruding, with a considerable amount of liquid plasticizers such as di-2-ethylhexyl phthalate or tricresyl phosphate, thereby to obtain a plasticized composition which can be easily processed and worked into the desired shape and which, in final use, possesses many properties not found in the resin itself and so essential for adoption of the resin to its many applications.

There are, however, several disadvantages necessarily attending the use of plasticizers. The plasticizers commonly employed are oily, liquid materials which, even when thoroughly mixed and "fluxed" with the vinyl resin, have a tendency to "bleed" or migrate to the surface of the composition, where they are lost through volatilization or by wiping, washing or other treatment with the result that the composition gradually stiffens and hardens and consequently fails in service. Moreover, it is difficult to produce a lasting adhesive bond between the surface of a plasticized vinyl resin composition and another surface because the oily plasticizer migrates to the adhesive layer and destroys the bond. Varnished or lacquered surfaces are also marred on prolonged contact with an article made of plasticized vinyl resin because of migration of the plasticizer present therein.

Still another disadvantage of conventionally plasticized vinyl resin compositions is that they do not have a good "feel" (they are slippery, cold and oily to the touch) and they are not sufficiently limp (a property commonly referred to as "drape") as to fall in graceful folds, as is desirable when the composition is to be used in the production of curtains, clothing, furniture upholstery and the like.

A still further and very serious disadvantage of plasticized resin compositions is an undesirable tendency to lose a large portion of their desirable physical properties when heated to moderately elevated temperatures. Thus plasticized vinyl resin compositions lose a large portion of their tensile strength and suffer plastic flow when heated to temperatures of about 100° to 125° F.

A further disadvantage is that the oily plasticizing materials must normally be incorporated into the vinyl resin by an expensive and time-consuming milling or mixing operation.

It is a primary object of this invention, therefore, to provide a new class of vinyl resins the members of which are possessed of many of the desirable properties possessed by known vinyl resins and plasticized vinyl resin compositions but which are so inherently processable that the addition of extraneous plasticizers is not required for production of thin films, sheets, rods or tubes, and which on that account are capable of being employed to produce numerous articles which are more durable, serviceable and otherwise desirable. Related objects are to provide vinyl plastics which are not subject to loss of plasticity by volatilization, bleeding or extraction of plasticizer and to provide vinyl plastics which are possessed of excellent "feel," "drape" and other sensory features not found in presently known vinyl plastics.

It is a further object of the invention to provide new vinyl resins which, without plasticizer, have improved resistance to the effects of high temperature so as to retain greater strength at such temperatures and are thereby useful over a wider temperature range than conventional plasticized vinyl resin compositions. Still another object is to provide vinyl resins with improved light and heat stability. The attainment of these and still other objects will become apparent in the description of the invention which follows.

I have found that by polymerizing, preferably in an aqueous medium, monomeric mixtures containing at least three components, each in definite proportions, one being vinyl chloride, another a vinyl ester of a monocarboxylic aromatic acid, preferably vinyl benzoate, and the third a higher alkyl acrylate, as hereinafter defined, I am able to obtain novel interpolymers which are inherently processable and have the other properties necessary for achieving the above and other objectives. The term "inherently processable" is used herein to denote that property or combination of properties which enables the interpolymers of this invention, whether relatively soft or hard, flexible or stiff at ordinary temperatures, to be easily milled, mixed with compounding ingredients, and extruded, calendered, molded or otherwise fabricated into various shapes and forms, without the addition of plasticizers and without being heated to excessively high temperatures.

The relative proportions of monomers which are employed in the production of my interpolymers are somewhat critical, since the desired properties are not secured with these monomers in any proportion, but may vary within certain limits. In the monomeric mixture I have found it necessary to employ from 35 to 90% by weight of vinyl chloride, from 5 to 60% by weight of the higher alkyl acrylate, and from 5 to 50% by weight of the vinyl aromatic ester with at least 90% by weight of the monomeric mixture made up of these three ingredients. Other monomeric materials such as vinylidene chloride, diethyl fumarate, acrylonitrile, styrene, lower alkyl acrylates such as methyl and ethyl acrylate and others are, if desired, utilizable to the extent of 10% by weight of the mixture but it is preferred that only monomeric materials of the three specified types be present. Particularly valuable are those interpolymers made from monomeric mixtures containing from 40 to 80% by weight of vinyl chloride, from 10 to 50% of the higher alkyl acrylate, and from 5 to 15% of vinyl aromatic ester. The softness and plasticity of my interpolymers at ordinary temperatures is largely regulated by the proportion of the various monomers. When the amount of the higher alkyl acrylate is 30 to 50% and the amount of vinyl chloride is 40 to 60%, the tripolymers are relatively softer and more plastic than those prepared using 70 or 80% of vinyl chloride with only 10 to 25% of alkyl acrylate.

Vinyl benzoate is a typical vinyl aromatic ester for use in this invention but vinyl esters of other aromatic acids in which a single carboxyl group is attached directly to a nuclear carbon atom are also utilizable. Among these are the vinyl esters of salicylic acid, amino-benzoic acid, chlorobenzoic acid, toluic acids, chloro-toluic acids, naphthoic acids, pyrocatechuic acid and others. Vinyl benzoate, however, by reason of its low cost and by reason of its forming excellent interpolymers with vinyl chloride and the higher alkyl acrylates is greatly preferred.

The higher alkyl acrylates which are employed in this invention are those alkyl esters of acrylic acid in which the alkyl group contains a chain of from 5 to 10 carbon atoms. I have found that the degree of plasticity and inherent processability present in my new tripolymers is largely determined by the length and configuration of the alkyl group in the alkyl acrylate and that this finding is roughly correlative with the observed degree of plasticization imparted to ordinary vinyl resins by extraneous addition of ester-type plasticizers containing similar alkyl groups. For example, di-2-ethylhexyl phthalate is an excellent plasticizer for vinyl chloride polymers and 2-ethylhexyl acrylate has been found to impart an excellent degree of inherent processability to its interpolymers with vinyl chloride and a vinyl aromatic ester. Illustrative higher alkyl acrylates within the above class utilizable in this invention include n-amyl acrylate, n-hexyl acrylate, isohexyl acrylates, isoheptyl acrylate, n-heptyl acrylate, capryl acrylate (1-methylheptyl acrylate), n-octyl acrylate, isooctyl acrylates such as 6-methylheptyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 atoms. Compounds within this class are 6-methylheptyl acrylate, 3,5,5-trimethylhexyl acrylate, 2-ethylhexyl acrylate, capryl acrylate (1-methylheptyl acrylate), n-octyl acrylate and others. These acrylates impart excellent inherent processability to my new interpolymers, n-octyl acrylate being the most proficient acrylate in this respect.

The polymerization of my new tripolymers may be carried out in any conventional manner although polymerization in aqueous emulsion, which may or may not contain an added emulsifying agent, is of course essential when it is desired to secure the tripolymer in form of a latex. In addition to this preferred method, the mixture of monomers may be polymerized in solution in a suitable solvent for the monomers, such as acetone, in which event the polymer precipitates from the solvent in granular form. Tripolymer in the form of fine granules is also secured by the so-called "pearl" type polymerization method in which the monomers are polymerized in aqueous suspension in the presence of a colloidal material such as gelatin, bentonite clay, polyvinyl alcohol, polyacrylic acid or the like. The polymerization may also be carried out in the absence of any solvent or diluent to yield a solid mass of the tripolymer. When a tripolymer is desired for the production of clear, transparent sheets and films, it is preferred to polymerize the mixture of monomers in an aqueous medium containing a very small amount only of an emulsifier or none at all, such a method being a "soapless" polymerization reaction. The "pearl" type suspension method is a satisfactory method for producing polymer for uses where clarity and transparency are not of highest importance but where high strength and other excellent physical properties possessed by high molecular weight polymers are essential.

Whatever method of polymerization is employed the catalyst may be any of the catalysts commonly employed for the polymerization of vinyl and vinylidene compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, postassium and ammonium persulfate, sodium perborate, sodium percarbonate and others.

The above class of catalysts reach their fullest activity when used in combination with a reducing substance in what is commonly referred to as a "redox" polymerization. Both the oxidizing and "redox" catalysts are also greatly activated by the presence of a small amount of a heavy metal salt. For example, the copending applications of G. W. Smith, Serial Nos. 779,411, now abandoned, 779,412, now U. S. Patent 2,473,548, and 779,413, now U. S. Patent 2,473,549, filed October 11, 1947, disclose the activation of potassium persulfate with, respectively, the combination of silver ion and ammonia, silver ion itself, and the combination of silver ion and water-soluble oxalates. The polymerization in aqueous medium also may utilize the activation of a persulfate catalyst with minute amounts of copper ions and sulfite ions to produce a "soapless" polymerization. All of these methods, and others known to the art, are utilizable in the production of my new tripolymers.

In some instances it may be desirable to control or adjust the hydrogen ion concentration of the polymerization mixture, which tends to become more acid because of liberation of HCl during the polymerization. It is preferred therefore that a buffering substance be added to the reaction mixture. For this purpose, sodium bicarbonate, sodium carbonate, disodium phosphate (Na₂HPO₄), trisodium phosphate, ammonium hydroxide, sodium hydroxide, the amino-substituted alcohols such as 2-amino-2-methyl-1-propanol and others are suitable.

Any of the usual emulsifying agents may be employed when the polymerization of the tripolymer is carried out in aqueous emulsion. Ordinary soaps such as the alkali metal, ammonium and alkanol-amine salts of fatty acids including sodium oleate, sodium myristate, potassium palmitate, ammonium stearate, ethanol amine laurate, and the like as well as rosin or dehydrogenated rosin acid soaps may be used, but more useful latices are secured with the synthetic saponaceous materials including hymolal sulfates and sulfonates of formula

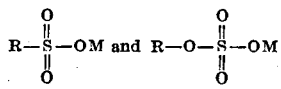

wherein R is an aliphatic hydrocarbon radical of 12 to 18 carbon atoms and M is an alkali metal, such as sodium lauryl sulfate, sodium cetyl sulfate, sodium salts of sulfonated paraffin oils, the sodium salts of dodecane-1-sulfonic acid, octadecane-1-sulfonic acid, etc.; alkaryl sulfonates such as the sodium alkyl benzene sulfonates, sodium isopropyl naphthalene sulfonate, sodium isobutyl naphthalene sulfonate, and the like; alkali metal salts of sulfonated dicarboxylic acid esters and amides such as sodium dioctyl sulfosuccinate, sodium - N - octadecyl-sulfosuccinamate, the sodium salt of N-octadecyl-N-(1,2-dicarboxyethyl) sulfosuccinamate and the like; and salts of organic bases containing long carbon chains, for example, the hydrochloride of diethylaminoethyloleylamide, lauryl amine hydrochloride, trimethyl cetyl ammonium bromide, and the like. Salts of organic bases (also called cationic soaps) give acidic emulsions and ordinary fatty acid soaps give alkaline emulsions, whereas the hymolal sulfates and sulfonates, which are particularly preferred, may be utilized in emulsions over a wide pH range. In addition to the above polar or ionic emulsifiers, still other materials which may be used singly or in combination with one or more of the above-named emulsifying agents include non-ionic emulsifiers such as the polyether alcohols prepared by condensing ethylene oxide with higher alcohols and the like.

While the polymerization may be carried out in the presence of air, the rate of reaction is ordinarily faster in the absence of oxygen and hence polymerization in an evacuated vessel or under an inert atmosphere is preferred. The temperature at which the polymerization is carried out is not critical, it may be varied widely from −30° to 100° C. or higher, though best results are generally obtained at a temperature of about 0° C. to about 70° C.

In order to minimize variation in the rate of reaction and to maintain a given proportion of each of the 3 monomers in the reaction mixture throughout the polymerization reaction (and thereby improve the homogeneity of the product), and especially when conducting the polymerization of large batches of monomers in aqueous emulsion in the presence of the powerful "redox" catalysts, it is desirable to introduce the acrylate and/or the vinyl aromatic ester gradually during the course of the polymerization. By the latter method the reaction may be made to proceed at a rate consistent with the heat transfer capacity of the polymerization vessel. The polymerization in aqueous emulsion also may be effected in the presence of a calculated amount of seed latex in order to obtain larger latex particles and greater fluidity for a given latex total solids content. If the amount of emulsifier in the aqueous emulsion is carefully controlled at somewhat less than the amount necessary to provide a monomolecular film of emulsifier on the latex particles, the initiation of new particles will be suppressed and the growth of larger latex particles will be favored. By these latter methods a latex of the interpolymers of this invention may be made having the high fluidity and over 50% total solids greatly desired in a latex for use as such in coating and dipping processes.

The preparation of the tripolymers of this invention will be more clearly described in the following specific examples which are intended merely as illustrations of the nature of my invention and not as limitations on the scope thereof.

*Example 1*

A tripolymer was prepared by polymerization of the monomeric materials contained in a reaction mixture prepared as follows:

| Material: | Parts/weight |
|---|---|
| Vinyl chloride | 45.00 |
| Isooctyl acrylate | 40.00 |
| Vinyl benzoate | 15.00 |
| Potassium persulfate | 1.00 |
| Sodium bisulfite (anhydrous) | 1.00 |
| Emulsifier [1] | 4.00 |
| Ammonia | 0.20 |
| Distilled water | 94.00 |

[1] A sodium derivative of a sulfonated hydrocarbon oil fraction known as "Duponol M. P. 189–S."

The water, emulsifying agent and potassium persulfate were charged to a polymerization reactor and the reactor was sealed and evacuated. The ammonia, monomers and sodium bisulfite were then added and the resulting emulsion maintained at 20° C. with constant agitation. In 39 hours and 40 minutes polymerization of the monomers present had proceeded to a yield of about 95%. The product was a fluid stable latex containing 46.5% total solids and having a pH of 8.

The latex was coagulated by addition of salt and acid and the coagulum dried to produce a granular interpolymer. The dry granular interpolymer was found to band into smooth clear sheets on a plastic roll mill at a roll temperature of only 160° F. without addition of plasticizer. The sheeted plastic did not stick to the rolls. The tripolymer sheet was soft (75 Duro. "A" at 30° C.) and exceedingly flexible. It had a dry feel and was limp enough as to be characterized as having good "drape."

In comparison, ordinary vinyl resins must be mixed with considerable plasticizer at temperatures generally above 240° F. in order to produce smooth clear sheets of similar hardness. Such sheets, moreover, have a slippery oily "feel" and even though plasticized by large amounts of oily plasticizers do not "drape" or fold properly and therefore are not as desirable for use in raincoats, curtains, tablecloths, etc. as the tripolymer of this example.

The tripolymer of Example 1 was tested to determine its stability to the effects of heat and light by a method utilizing the tendency of vinyl resins to become opaque and discolored when heated or exposed to strong ultra-violet light. By this method the resin is coated on a clean glass microscope slide and the light transmission through the coating measured before and after exposure. After heating for 24 hours at 175° C. in a mechanical convection air oven the percent light transmission of the tripolymer was 69.8%. The percent light transmission after such a heat treatment of polyvinyl chloride was about 50%. Similarly after exposure under a powerful ultraviolet light for 4 hours, the light transmission of the tripolymer was 87% and that of polyvinyl chloride about 60%.

The resistance of the tripolymer of Example 1 to the effects of heat can be shown in still another manner. When a plasticized vinyl resin is heated in a mechanical convection air oven for 168 hours (7 days) at 100° C., the resin suffers a loss of weight (due to loss of plasticizer or chemical breakdown or both), a decrease in tensile strength and modulus at 100% elongation, and sometimes a large increase or decrease in elongation. A sample of the tripolymer of Example 1 compounded with 2½% by weight based on the resin of a stabilizer consisting of the mixed cadmium salts of fatty acids and naphthenic acids, after such a test showed a zero loss in weight, a 100 lbs./sq. in. increase in tensile strength and no change in 100% modulus or elongation. A sample of high grade polyvinyl chloride similarly stabilized and plasticized with 35 parts by weight of di-2-ethylhexyl phthalate, was found to suffer a 5 to 10% loss in weight, up to 100% decrease in elongation, and a 30% decrease in modulus at 100% elongation.

*Examples 2 to 5*

Tripolymers of varying hardness, but which nevertheless, like the tripolymer of Example 1, may be milled, calendered and extruded without extraneous addition of plasticizer to form articles of great flexibility, clarity, heat and light resistance and having good high temperature properties, are obtained by varying the acrylate monomer. To illustrate, mixtures of materials were prepared having the following composition:

| Material: | Parts/wt. |
|---|---|
| Vinyl chloride | 55.00 |
| Acrylate (variable in kind) | 30.00 |
| Vinyl benzoate | 15.00 |
| Potassium persulfate | 0.50 |
| Emulsifier [1] | 4.00 |
| Ammonia ($NH_3$) | 0.20 |
| Water | 95.00 |

[1] Same as in Example 1.

The mixtures were agitated at 50° C. for from 8 to 15 hours to produce yields of tripolymer of about 95% in the form of stable latices containing from 51 to 53% total solids. The latices were coagulated as in Example 1 to obtain in each case a coagulum which was dried to form a non-tacky granular polymer. In each case the granular polymer was found to band into a smooth sheet on a roll mill at mill roll temperature of only 160° F. The hardness of each tripolymer together with the higher alkyl acrylate employed in its production are listed below:

*Example 2.*—Isononyl acrylate—87 C (Duro. "C")
*Example 3.*—Isooctyl acrylate—95 A (Duro. "A")
*Example 4.*—2-ethylhexyl acrylate—92 A (Duro. "A")
*Example 5.*—n-Octyl acrylate—86 A (Duro. "A")

It is to be noted that n-octyl acrylate produced the softest tripolymer and that isononyl acrylate the hardest. However, all of the tripolymers were easily calendered into flexible clear sheets and films.

The tensile strength of the tripolymer of Example 2, determined at 125° F., was 70% of its tensile strength determined at room temperature, and its modulus at 100% elongation at 125° F. was 55 to 65% of the value at room temperature. A sample of polyvinyl chloride plasticized with sufficient di-2-ethylhexyl phthalate to produce an equivalent hardness, had a tensile strength at 125° F. 66% that of the value at room temperature, and its modulus at 125° F. was only 33% of that at room temperature. Thus, it is seen that the tripolymers of this invention retain their physical properties at elevated temperatures to a better degree than does conventional plasticized polyvinyl chloride.

In addition, the tripolymer of Example 2 also had a brittleness temperature of −40° F. and a crescent tear strength of 610 lbs./in. (polyvinyl chloride plasticized with 50 parts/100 of resin of di-2-ethylhexyl phthalate has a brittleness temperature of 0° to −35° F. and a crescent tear strength of 500 lbs./in.). The described properties make the tripolymer of Example 2 ideally suited for the production of thin films and sheets.

The tripolymers of Examples 3, 4 and 5 were materials very similar to that of Example 2 in their resistance to high temperatures, though softer as described above. All of the tripolymer latices produced in these examples gave clear, flexible and homogeneous films when the latex was cast on a surface and the film heated to 150° C. These films were limp (good drape) and yet were tough. The light stability of the tripolymers of Examples 3 to 5 ranged from 75 to 88% and the heat stability ranged from 70 to 80%.

*Example 6*

A mixture of 70 parts of vinyl chloride, 25 parts of 2-ethylhexyl acrylate, and 5 parts of vinyl benzoate was polymerized as in Examples 2 to 5 in 13 hours at 50° C. to a yield of over 90%. The tripolymer was obtained as a stable latex containing 52% total solids. The tripolymer was tougher than that from any of the previous examples yet could be milled with roll temperatures of about 175° F., could be calendered into thin clear films and extruded into clear, strong and stiff tubes and rods, all without the addition of plasticizer.

*Example 7*

A tripolymer was made using the polymerization recipe of Example 1, but a polymerization temperature of only 10° C. The resulting tripolymer was harder and tougher than that of Example 1, yet it did not become brittle at temperatures as low as −50° F. Moreover, it could be milled and sheeted without plasticizer at only 160° F. When 0.5% lead stearate and 2% of strontium naphthenate (based on the resin) were incorporated therein a smooth homogeneous composition resulted which could be press molded for 2 minutes at 300° F. to produce flexible clear sheets of excellent properties. Determination of the physical properties of the press molded sheets revealed that the composition surprisingly was stronger at 125° F. than at ordinary room temperature. For example, the properties at room temperature were tensile strength 1600 lbs./sq. in., 100% modulus 1200 lbs./sq. in., and elongation 210% while at 125° F. the corresponding properties were tensile strength 2000 lbs./sq. in., 100% modulus 1200 lbs./sq. in. and elongation 270%. Such an extraordinary combination of great low temperature flexibility and excellent strength at high temperatures adapts the tripolymer of this example to a wide variety of uses wherein a plastic material is subjected to both low and high temperatures. Such uses include wearing apparel, frozen food packages wherein the food is also cooked in the same package, shower curtains, table cloths and pads and the like.

*Example 8*

A tripolymer was made in the same manner as in Examples 2 to 5, from a monomeric mixture consisting of 80% by weight of vinyl chloride, 10% n-octyl acrylate, and 10% of vinyl benzoate. It was a hard stiff material (66 Duro. "C") yet could be processed without plasticizer. For example, the hard tripolymer formed a smooth band on a two-roll plastic mill at only 200° F. The entire milling cycle during which 0.5% by weight of carnauba wax and 2% by weight of a mixture of barium ricinoleate and cadmium naphthenate were incorporated consumed only 8 minutes at 200° F. By contrast powdery polyvinyl chloride first must be premixed with a liquid plasticizer in an operation requiring from 5 to 10 minutes and the moist powder then milled for 10 minutes at 280° F. to be converted into a plasticized composition. The hard tripolymer of this example thus could be milled and compounded at a lower temperature and in a shorter time. Because the tripolymer did not require as high a processing temperature nor as long a processing time it evidenced stability to discoloration during milling superior to that of polyvinyl chloride. The tripolymer, in the granular form obtained by coagulation of the latex, could be extruded directly in the form of hard rigid rods and tubes utilizing an extruder having a neutral screw (neither heated nor cooled), a back cylinder temperature of only 200° F. and a front die tip temperature of only 210° F. By contrast, plasticized polyvinyl chloride composition of greater softness requires for smooth extrusion a back cylinder temperature of 340° F. or more and a die tip temperature of 390 to 400° F. The tripolymer could also be calendered into smooth clear films of about 10 mils thickness by first sheeting the tripolymer composition on a warm-up mill at 200° F. and then transfering the warm plastic to a four roll calender having all four rolls maintained at about 240° F. To calender a plasticized polyvinyl chloride composition, on the other hand, calender roll temperatures of 350° F. or more are required. The 80/10/10 tripolymer of this Example 8 was also found to be ideally adapted to the production of monofilaments for use as brush fibers and the like.

The above-described processing operations performed on the tripolymer of Example 8 clearly illustrate the high degree of inherent processability possessed by even the hard stiff tripolymers of this invention. Such inherent processability coupled with hardness and rigidity is possessed to a greater or lesser degree by the interpolymers of this invention made from monomeric mixtures containing from 60 to 90% by weight of vinyl chloride together with 5 to 25% by weight of the higher alkyl acrylate and 5 to 15% of vinyl aromatic ester. The softer interpolymers of this invention also prossess inherent processability and, in addition, softness and internal plasticity. For example, tripolymers made from monomeric mixtures containing from 35 to 60% vinyl chloride together with nearly equal amounts of higher alkyl acrylate and 5 to 15% of vinyl aromatic ester are inherently processable and are particularly adapted to uses where softness and flexibility are essential. Thus, within the broadest monomeric proportions specified herein interpolymers are produced having wide variations in their properties, but which, whether hard or soft, stiff or flexible, are possessed of the common property of being so inherently processable as to require no added plasticizer for good processing or to attain desirable plastic properties in the finished product.

Similar results are obtained when using monomer combinations of the type disclosed herein other than those specified in the previous Examples 1 to 8. For example, a mixture of 70% vinyl chloride, 25% n-amyl acrylate and 5% vinyl toluate produced a tripolymer which could be milled and masticated at 160 to 200° F. without plasticizer but which at room temperature is somewhat tougher than the tripolymers of Examples 1 to 5. Similarly, a mixture of 65 parts vinyl chloride, 25 parts of capryl acrylate and 10 parts of vinyl chlorobenzoate produced a tripolymer which was inherently processable at milling temperatures of 175 to 200° F. but which is tough and clear at room temperature.

Interpolymers closely similar to those described above are obtained when up to 10% of acrylonitrile, vinylidene chloride, styrene, or a lower alkyl acrylate is polymerized along with a mixture containing the described proportions of vinyl chloride, higher acrylate and vinyl benzoate. However, the use of these fourth monomers does not generally result in additional valuable properties and it is preferred, therefore, to produce interpolymers from monomeric mixtures containing only vinyl chloride, vinyl ester and higher alkyl acrylate.

While the invention has been described with particular reference to certain preferred embodiments thereof, it is to be understood that the

I claim:

1. An interpolymer made by polymerizing a mixture of monomeric materials comprising from 35 to 90% by weight of vinyl chloride, from 5 to 50% by weight of a vinyl ester of an aromatic acid in which a single carboxyl group is attached directly to a nuclear carbon atom, and from 5 to 60% by weight of an alkyl ester of acrylic acid in which the alkyl group contains a chain of from 5 to 10 carbon atoms.

2. An interpolymer made by polymerizing in aqueous emulsion a mixture of monomeric materials comprising from 35 to 90% by weight of vinyl chloride, from 5 to 50% by weight of vinyl benzoate, and from 5 to 60% by weight of an alkyl ester of acrylic acid in which the alkyl group contains a chain of from 5 to 10 carbon atoms.

3. An interpolymer made by polymerizing in aqueous emulsion a mixture of monomeric materials comprising from 40 to 80% by weight of vinyl chloride, from 5 to 15% by weight of vinyl benzoate, and from 10 to 50% by weight of an alkyl acrylate in which the alkyl group contains a total of 8 to 10 carbon atoms and possesses a carbon chain of 6 to 10 carbon atoms.

4. A tripolymer made by polymerizing a monomeric mixture consisting of from 40 to 80% by weight of vinyl chloride, from 5 to 15% by weight of vinyl benzoate and from 10 to 50% by weight of n-octyl acrylate.

5. A tripolymer made by polymerizing a monomeric mixture consisting of from 40 to 80% by weight of vinyl chloride, from 5 to 15% by weight of vinyl benzoate, and from 10 to 50% by weight of 2-ethylhexyl acrylate.

6. A tripolymer made by polymerizing a monomeric mixture consisting of from 40 to 80% by weight of vinyl chloride, from 5 to 15% by weight of vinyl benzoate, and from 10 to 50% by weight of isooctyl acrylate.

ROBERT J. WOLF.

REFERENCES CITED

The following references are of record in the file of this patent:

UNITED STATES PATENTS

| Number | Name | Date |
|---|---|---|
| 2,462,422 | Plambeck, Jr. | Feb. 22, 1949 |

OTHER REFERENCES

Modern Plastics, September 1947, pages 128 and 129.

Ser. No. 397,138, Fikentscher et al. (A. P. C.), published May 11, 1943.